(12) United States Patent
Yasaki et al.

(10) Patent No.: US 7,882,541 B2
(45) Date of Patent: Feb. 1, 2011

(54) AUTHENTICATION SYSTEM IN INFORMATION PROCESSING TERMINAL USING MOBILE INFORMATION PROCESSING DEVICE

(75) Inventors: Kouichi Yasaki, Kawasaki (JP); Isamu Yamada, Kawasaki (JP); Shinichi Shiotsu, Kawasaki (JP); Seiki Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 856 days.

(21) Appl. No.: 11/819,207

(22) Filed: Jun. 26, 2007

(65) Prior Publication Data

US 2008/0127311 A1    May 29, 2008

Related U.S. Application Data

(63) Continuation of application No. PCT/JP2005/000034, filed on Jan. 5, 2005.

(51) Int. Cl.
*H04L 9/32* (2006.01)
*H04L 9/00* (2006.01)

(52) U.S. Cl. .......................... 726/2; 713/168
(58) Field of Classification Search ......... 713/168–170, 713/189; 726/2–5; 380/270
See application file for complete search history.

(56) References Cited

U.S. PATENT DOCUMENTS

| | | | | |
|---|---|---|---|---|
| 7,286,671 | B2 * | 10/2007 | Yegin et al. | 380/270 |
| 7,290,141 | B2 * | 10/2007 | Sengodan et al. | 713/168 |
| 2001/0018329 | A1 | 8/2001 | Tada et al. | |
| 2004/0046638 | A1 | 3/2004 | Kawasaki | |

FOREIGN PATENT DOCUMENTS

| | | |
|---|---|---|
| JP | 2001117878 | 4/2001 |
| JP | 2001-184149 | 7/2001 |
| JP | 2003-317072 | 11/2003 |
| JP | 2004-102682 | 4/2004 |

OTHER PUBLICATIONS http://ne.nikkeibp.co.jp/members/NEWS/20040722/104597; Jul. 22, 2004 (2 Sheets);/Discussed in the specification.

* cited by examiner

*Primary Examiner*—Hosuk Song
(74) *Attorney, Agent, or Firm*—Fujitsu Patent Center

(57) ABSTRACT

A mobile information processing device (200) obtains specific information of a user in response to an operation by the user, authenticates the user based on the specific information, establishes the first wireless communication mode, and then transmits authentication information to an information processing terminal. The information processing terminal (100) receives the authentication information from the mobile information processing device in the first wireless communication mode (A), verifies the received authentication information, generates an identification based on the resultant verification, transmits, in the first wireless communication mode, the identification to the mobile information processing device, then changes from the first wireless communication mode into the second wireless communication mode (B), and iteratively performs polling of the mobile information processing device. The mobile information processing device receives the identification from the information processing terminal in the first wireless communication mode, then changes from the first wireless communication mode to the second wireless communication mode, and transmits, in response to the polling from the information processing terminal, a reply containing the identification back to the information processing terminal in the second wireless communication mode. Thus the presence of the mobile information processing device is managed.

11 Claims, 12 Drawing Sheets

AUTHENTICATION SYSTEM IN INFORMATION PROCESSING TERMINAL USING MOBILE INFORMATION PROCESSING DEVICE

This application is a continuation of international application PCT/JP05/000034 filed Jan. 5, 2005.

FIELD OF THE INVENTION

The present invention relates generally to a security system of an information processing terminal, and particularly to a security system of an information processing terminal having an authentication function with the use of a mobile or portable device through the Near Field Communication (NFC).

BACKGROUND ART

Mobile or cellular telephones may store important information including personal information, such as address books and electronic money. Stricter personal authentication modules, such as fingerprint authentication, are now often implemented as security measures of such mobile telephones, which may be advantageous upon loss of them for example.

Meanwhile, personal computers (PCs) such as notebook PCs may also often store confidential information and personal information. Not only passwords but also stricter personal authentication schemes, such as biometric authentication, e.g. IC cards and fingerprint authentication, are now employed as security measures of such PCs, which may be advantageous upon loss of them for example.

Japanese Patent Application Publication JP 2001-117878-A published on Apr. 27, 2001 describes a system for identifying and authenticating individual persons. In this identifying and authenticating system, a mobile communication device detects biometric information of an operator, transmits it as authentication data and receives a connection permitting signal or a connection non-permitting signal corresponding to the authentication data. A function embodied apparatus receives authentication data from the communication device, and transmits this data. The apparatus further transmits the connection permitting signal for permitting connection to the apparatus, when it receives an authentication result for the authentication data and the authentication result indicates that the authentication data is to be positively authenticated. The apparatus further transmits the connection non-permitting signal not for permitting connection to the apparatus, when the authentication result indicates that the authentication data is not to be authenticated. An authentication center receives the authentication data from the function embodied apparatus checks whether or not the authentication data is to be positively authenticated, and transmits the authentication result for transmitting the authentication result. In this identifying and authenticating system, the mobile communication device in conjunction with the center authenticates the operator's biometric information, and permits his or her login to the function embodied apparatus with the use of the authentication result.

The Web page of http://ne.nikkeibp.co.jp/members/NEWS/20040722/104597/ dated Jul. 22, 2004 describes registering a mobile telephone with a notebook PC and allowing user's login to the notebook PC if the mobile telephone is located nearby.

DISCLOSURE OF THE INVENTION

The identifying and authenticating system of the publication JP 2001-117878-A described above works well, as long as required processing in an apparatus, such as in an ATM (automatic teller machine), is completed in a short time. However, in a PC which may be used by a user for a longer period of time after authentication, it is required to manage the presence of the user who has been authenticated, i.e. as to whether the user is still staying near the PC. A known technique of management of user presence utilizes a wireless communication device provided in a mobile telephone. In this case, however, such a wireless communication device must be activated all the time. Thus, the mobile telephone employing a battery increases its battery power consumption significantly, and hence the battery run time becomes shorter accordingly, which is a problem.

Further, every time the user uses the notebook PC, he or she must undergo the strict person authentication by means of the mobile telephone and the notebook PC. If a plurality of different authentication techniques, such as fingerprint authentication and IC card authentication, are used in the person authentication method, respective operations for the authentication techniques are vexatious for the user.

An object of the present invention is to provide a security system of an information processing terminal which has an authentication function using a mobile information processing device, and is capable of managing the presence of a user for a longer period of time.

Another object of the present invention is to reduce the power consumption of the mobile information processing device for authentication required for allowing use of the information processing terminal.

SUMMARY OF THE INVENTION

In accordance with an aspect of the present invention, an authentication system which manages presence of a user comprises a mobile information processing device. The mobile information processing device includes: a first authentication database which pre-stores authentication information for the user; a first shared identification storage unit which stores a shared identification for presence management, which identification is received from an information processing terminal; an authentication information input unit which obtains authentication information specific to the user, after a path to the information processing terminal in a first wireless communication mode is established; a first authentication unit which, when the authentication information input unit obtains the authentication information, verifies as to whether the obtained authentication information is correct by comparing the obtained authentication information with the pre-stored authentication information in the first authentication database, and which stores the shared identification for presence management in the first shared identification storage unit when the first authentication unit receives the shared identification from the information processing terminal; a first display unit which indicates representation of failure of authentication when the obtained authentication information is verified as incorrect; and a first communication unit which is capable of wirelessly communicating with the information processing terminal, in the first wireless communication mode for two-way communication or in a second wireless communication mode for near field communication, wherein the first communication unit transmits, in response to an operation input by the user, a request for the two-way communication to the information processing terminal, wherein the first communication unit transmits, when the authentication information verified by the first authentication unit is correct, the authentication information to the information processing terminal in the first wireless communication mode, then receives the shared identification for presence management from the information processing terminal in the first wireless communication mode, and then changes from the first wireless communication mode into the second wireless communication mode, and wherein the first communication unit transmits, in response to the polling from the information processing terminal, a reply containing the shared identification for presence management in the second wireless communication mode back to the information processing terminal. The authentication system further comprises a mobile information processing device. The information processing terminal includes: a second authentication database which pre-stores authentication information for the user; a second shared identification storage unit which stores a shared identification for presence management; a second authentication unit which verifies as to whether the authentication information received from the mobile information processing device is correct by looking into the second authentication database, and which unit generates a shared identification for presence management and stores the generated shared identification for presence management in the second shared identification storage unit, when the received authentication information is verified as correct; a second display unit which indicates representation of failure of authentication when the received authentication information is verified as incorrect; and a second communication unit which is capable of wirelessly communicating with the mobile information processing device, in the first wireless communication mode for two-way communication or in the second wireless communication mode for near field communication, wherein the second communication unit of the first wireless communication mode establishes, in response to a request for two-way communication transmitted by the mobile information processing device, a two-way wireless communication path to the mobile information processing device, wherein the second communication unit receives, in the first wireless communication mode, the authentication information from the mobile information processing device, wherein the second communication unit changes, when the received authentication information is verified as correct, from the first wireless communication mode into the second wireless communication mode, and iteratively performs polling of the mobile information processing device to receive a reply from the mobile information processing device, and wherein the second communication unit determines, when no correct shared identification has been received from the mobile information processing device in the second wireless communication mode, whether a number of successive errors transcends a threshold number or whether a time length of successive errors transcends a threshold time length, and locks a display screen of the second display unit when the threshold number or the threshold time length is transcended.

In accordance with another aspect of the present invention, a mobile information processing device manages presence of a user in cooperative operation with an information processing terminal. The mobile information processing device comprises: an authentication database which pre-stores authentication information for the user; a shared identification storage unit which stores a shared identification for presence management, which identification is received from the information processing terminal; an authentication information input unit which obtains authentication information specific to the user, after a path to the information processing terminal in a wireless communication mode is established; an authentication unit which, when the authentication information input unit obtains the authentication information, verifies as to whether the obtained authentication information is correct by comparing the obtained authentication information with the pre-stored authentication information in the first authentication database, and which, when the authentication unit receives a shared identification for presence management from the information processing terminal, stores the received shared identification for presence management in the shared identification storage unit; a display unit which indicates representation of failure of authentication when the obtained authentication information is verified as incorrect; and a communication unit which is capable of wirelessly communicating with an information processing terminal, in the first wireless communication mode for two-way communication or in a second wireless communication mode for near field communication, wherein the communication unit transmits, in response to an operation input by the user, a request for two-way communication to the information processing terminal, wherein the communication unit, when the obtained authentication information is verified by the authentication unit as correct, transmits the authentication information in the first wireless communication mode to the information processing terminal, then receives, in the first wireless communication mode, the shared identification for presence management from the information processing terminal, and then changes from the first wireless communication mode into the second wireless communication mode, and wherein the communication unit transmits, in response to the polling from the information processing terminal, a reply containing the shared identification for presence management in the second wireless communication mode back to the information processing terminal.

In accordance with a further aspect of the present invention, an information processing terminal is used for managing presence of a user in cooperative operation with a mobile information processing device. The information processing terminal comprises: an authentication database which pre-stores authentication information for the user; a shared identification storage unit which stores a shared identification for presence management; an authentication unit which verifies as to whether the authentication information received from the mobile information processing device is correct by looking into the authentication database, and which unit generates a shared identification for presence management and stores the shared identification for presence management in the shared identification storage unit, when the received authentication information is verified as correct; a display unit which indicates representation of failure of authentication when the received authentication information is verified as incorrect; and a communication unit which is capable of wirelessly communicating with the mobile information processing device, in a first wireless communication mode for two-way communication or in a second wireless communication mode for near field communication, wherein the communication unit establishes, in response to a request for two-way communication transmitted by the mobile information processing device, a two-way wireless communication path to the mobile information processing device in the first wireless communication mode, wherein the communication unit receives the authentication information in the first wireless communication mode from the mobile information processing device, wherein the communication unit changes, when the received authentication information is verified as correct, from the first wireless communication mode into the second wireless communication mode, then iteratively performs polling of the mobile information processing device to receive a reply from the mobile information processing device, and wherein the communication unit determines, when no correct shared identification has been received in the second wireless communication mode from the mobile information processing device, whether a number of successive errors transcends a threshold number, or whether a time length of successive errors transcends a threshold time length, and locks a display screen of the display unit when the threshold number or the threshold time length is transcended.

The invention also relates to a program for implementing the mobile information processing device described above.

According to the invention, the presence of a user can be managed for a longer period of time, and the power consumption of a mobile information processing device for required authentication can be reduced.

DESCRIPTION OF THE PREFERRED EMBODIMENTS

The invention will be described with reference to the accompanying drawings. Throughout the drawings, similar symbols and numerals indicate similar items and functions.

Figure 1:
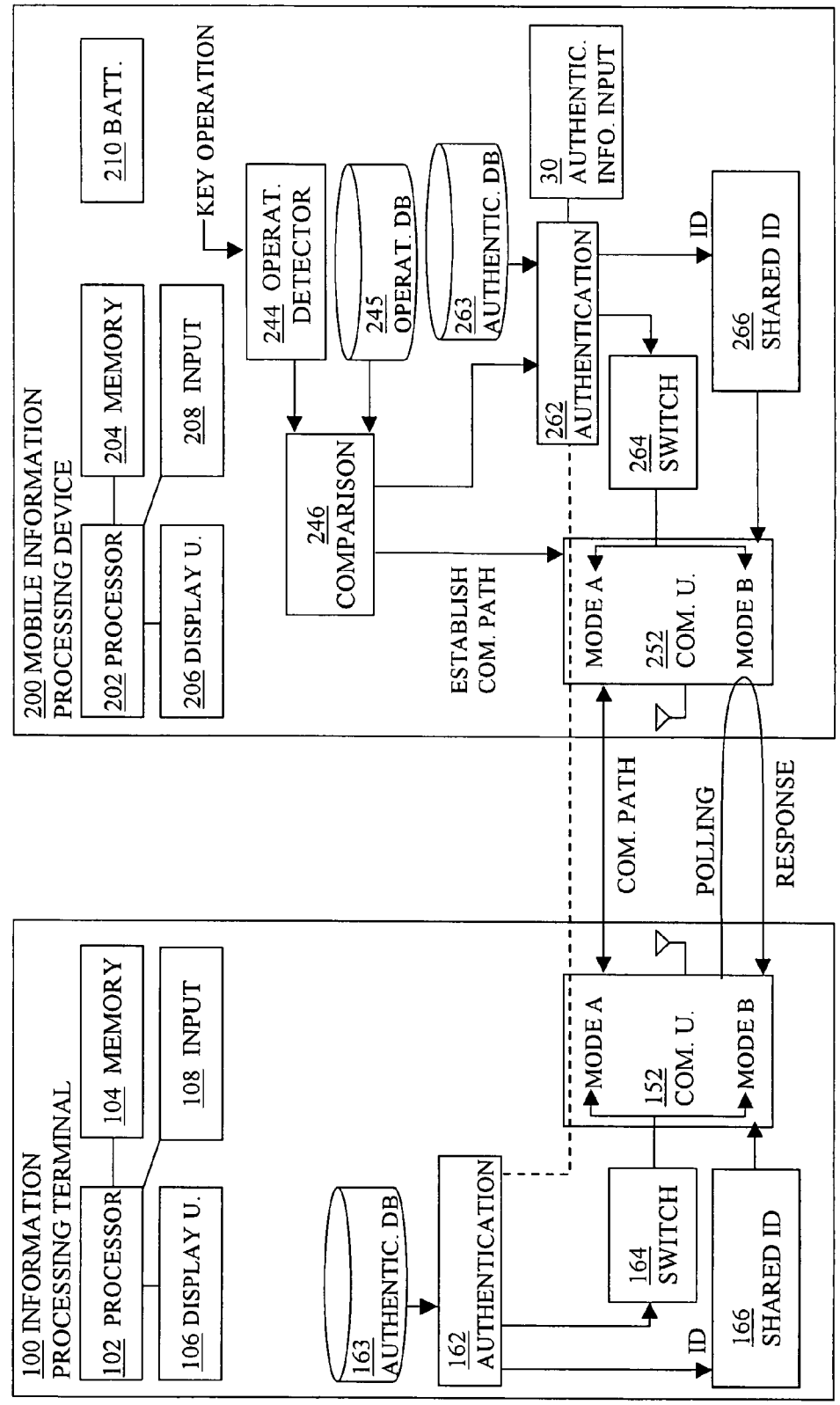
FIG. 1 illustrates an information processing terminal with an authentication function, and a mobile information processing device, in accordance with an embodiment of the present invention.

FIG. 1 illustrates an information processing terminal 100 with an authentication function, and a mobile information processing device 200, in accordance with an embodiment of the present invention. The information processing terminal 100 may be an information processing device, such as a desktop personal computer (PC) or notebook PC, having a user authentication function. The mobile information processing device 200 may be a mobile device, such as a mobile or cellular telephone or a PDA (personal digital assistant). It is assumed herein that a user always carries the mobile information processing device 200.

Figure 2:
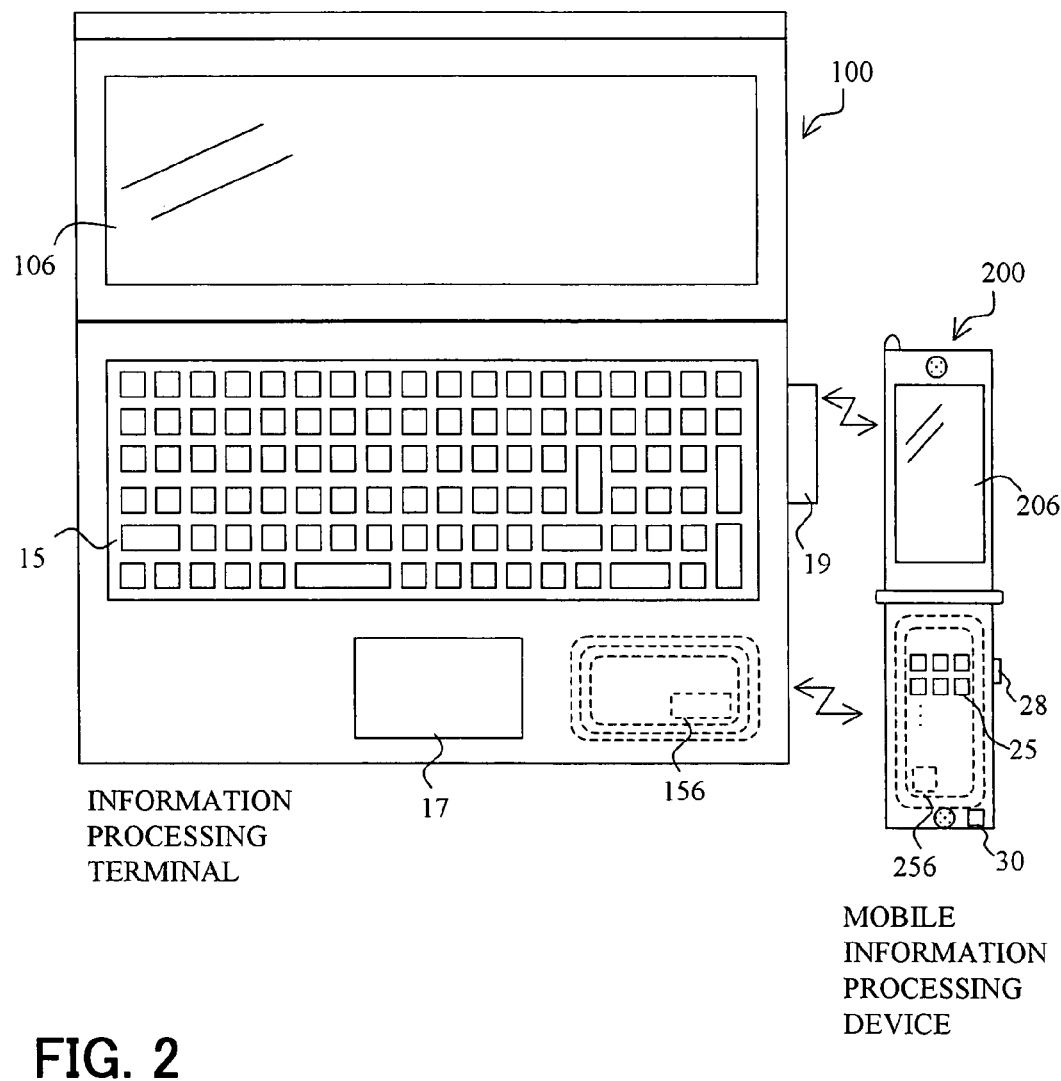
FIG. 2 illustrates a schematic appearance of the information processing terminal as a notebook PC, and the mobile information processing device as a mobile telephone.

FIG. 2 illustrates a schematic appearance of the information processing terminal 100 as a notebook PC and the mobile information processing device 200 as a mobile telephone.

In FIG. 1, the information processing terminal 100 includes a processor 102, a memory 104, a display or presentation unit 106 having a display and a speaker, an input unit 108 such as a keyboard and a pointing device, a communication unit 152 which operates in an active mode of operation in compliance with the Near Field Communication (NFC) standard, an authentication unit 162, an authentication database (DB) 163, a switching unit 164, and a shared ID storage unit 166. The NFC standard is a two-way, Near Field Communication standard defined in the International Standard ISO/IEC IS 18092, for the communication at the frequency of 13.56 MHz, in a short-range in the order of 10 cm for example, and at a data rate of 100-400 kbps. In FIG. 2, the information processing terminal 100 includes a keyboard 15, a touchpad 17 as a pointing device, and an NFC transceiver unit 156 as a communication unit 152. The information processing terminal 100 may further include a communication unit 19 in compliance with the Bluetooth standard, the wireless LAN standard, and/or the UWB standard.

In FIG. 1, the mobile information processing device 200 includes a processor 202, a memory 204, a display or presentation unit 206, an input unit 208 such as keys, a rechargeable battery 210, an operation detector unit 244, an operation database (DB) 245, a comparator unit 246, a communication unit 252 that operates in an active mode of operation and a passive mode of operation in compliance with the NFC standard, an authentication unit 262, an authentication database (DB) 263, a switching unit 264, a shared ID storage unit 266, and an authentication information input unit 30 coupled to the authentication unit 262. In FIG. 2, the mobile information processing device 200 includes keys 25 and 28, and an NFC transceiver unit 256 as a communication unit 252. The mobile information processing device 200 may further include a communication unit in compliance with the Bluetooth standard, the wireless LAN standards, and/or the UWB standard.

In the information processing terminal 100, the authentication unit 162 and the switching unit 164 may be implemented in the form of software as functions implemented on the processor 102 which operates according to the programs stored in the memory 104. In the mobile information processing device 200, the comparator unit 246, the operation detector unit 244, the authentication unit 262 and the switching unit 264 may be implemented in the form of software as functions implemented on the processor 202 which operates according to the programs stored in the memory 204.

The communication unit 152 and the communication unit 252 communicate with each other for authentication in a communication mode of operation A, and communicate with each other for presence management in another communication mode of operation B for the Near Field Communication. The communication unit 152 and the communication unit 252 perform transmission with a transmission power for normal communication in a predetermined range of, for example, about 10 cm, either only in the communication mode B or in both of the communication modes A and B. The transmission power of each of the communication units 152 and 252 in the communication mode A may be larger than that of each unit in the communication mode B.

Figure 3:
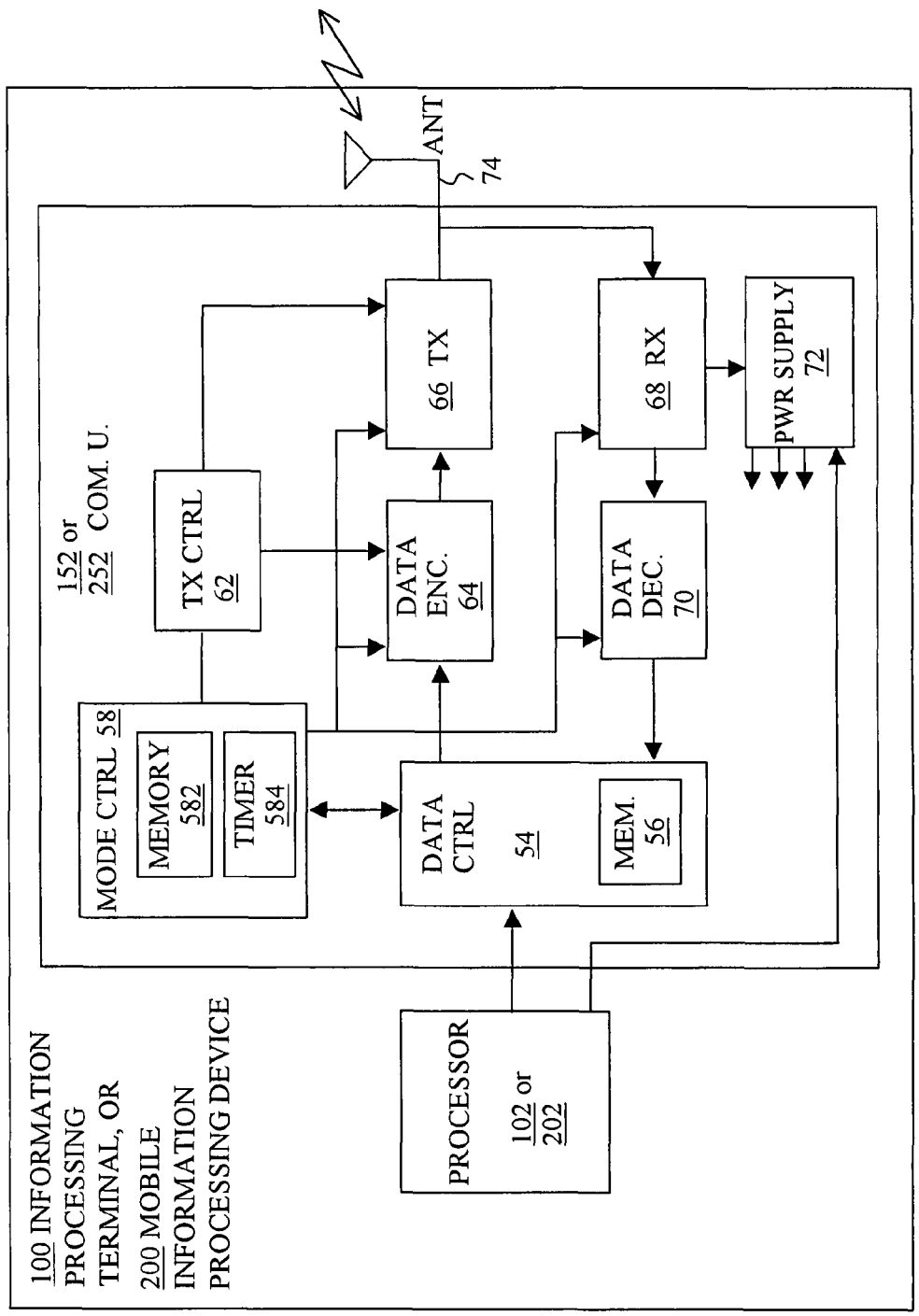
FIG. 3 illustrates a configuration of each of a communication unit of the information processing terminal, and a communication unit of the mobile information processing device.

FIG. 3 illustrates a configuration of each of the communication unit 152 of the information processing terminal 100, and the communication unit 252 of the mobile information processing device 200. The communication units 152 and 252 can operate in an active mode of operation and in a passive mode of operation. In this case, the communication unit 152 is controlled to operate only in the active mode of operation. While the mobile information processing device 200 is operating in the active mode of operation, it consumes a larger power, and hence the run time of the battery 210 becomes shorter. In order to make the run time of the battery 200 longer, it is not desirable to cause the mobile information processing device 200 to operate in the active mode of operation for a longer period of time. On the other hand, the mobile information processing device 200 can significantly reduce the power consumption in the passive mode of operation compared to the active mode of operation, to thereby make the run time of the battery 210 longer and hence enable the mobile information processing device 200 to operate longer.

Each of the communication units 152 and 252 include a data control unit 54 having a memory 56, a data encoding unit 64 for transmission, a transmitter (TX) 66 coupled to a coil antenna (ANT) 74, a receiver (RX) 68 coupled to the coil antenna (ANT) 74, a data decoding unit 70, a mode control unit 58 having a memory 582 and a timer 584, a transmission control unit 62 coupled to the mode control unit 58, and a power supply circuit 72 coupled to the receiver (RX) 68 and the processor 102 or 202 for supplying power to the elements of the communication unit.

The operation mode control unit 58 determines the current operation mode, i.e. an active or passive mode of operation, of the communication unit 152 or 252, and provides, to the transmission control unit 62, a switching control signal corresponding to the current operation mode of the communication unit 152 or 252. The operation mode control unit 58 enables or disables the data encoding unit 64 and the transmitter 66 in accordance with the current operation mode, i.e. the active or passive mode of operation. In the communication unit 252 operating in the passive mode of operation, the power supply circuit 72 may supply power to all or some of the elements 54, 58, 62, 64, 66 and 70, with the use of energy of the received RF signals, only during the reception of the RF signals from the communication unit 152.

Figure 4:
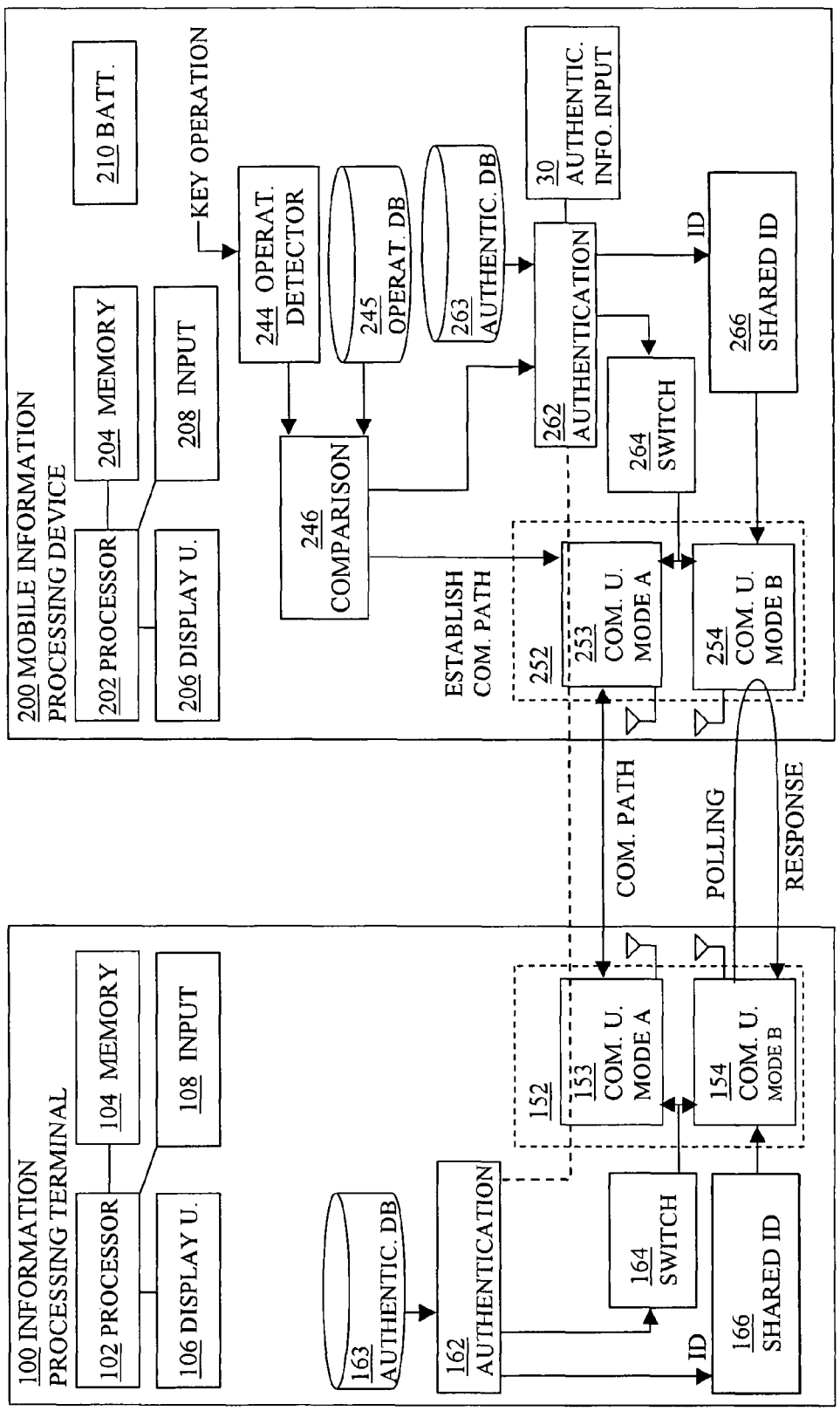
FIG. 4 illustrates the information processing terminal with an authentication function, and the mobile information processing device, in accordance with another embodiment of the invention.

FIG. 4 illustrates the information processing terminal 100 with an authentication function, and the mobile information processing device 200, in accordance with another embodiment of the invention. In this figure, the information processing terminal 100 includes a communication unit 153 for the communication mode A and a communication unit 154 for the communication mode B, both of which form the communication unit 152. The mobile information processing device 200 includes a communication unit 253 for the communication mode A and a communication unit 254 for the communication mode B, both of which form the communication unit 252. The communication units 153 and 253 for the communication mode A may be in compliance with the same, any of the NFC standard, the Bluetooth standard, the wireless LAN standard and the UWB standard. In the communication mode B, the information processing terminal 100 and the mobile information processing device 200 cannot communicate with each other, when the distance between them becomes larger than the predetermined distance of, for example, about 10 cm.

Figure 5A:
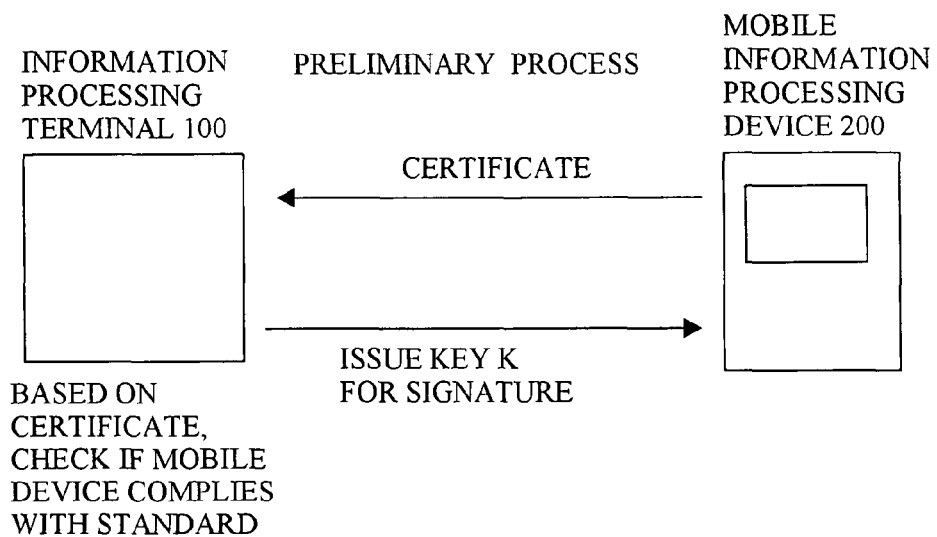
FIG. 5A illustrates preliminary settings made between the information processing terminal and the mobile information processing device.

FIG. 5A illustrates preliminary settings made between the information processing terminal 100 and the mobile information processing device 200. The information processing terminal 100 in the communication mode A receives a certificate from the mobile information processing device 200. The information processing terminal 100 verifies the received certificate to determine whether the mobile information processing device 200 complies with the standard. If it is determined that it complies with the standard, the information processing terminal 100 transmits a key K for signature to the mobile information processing device 200. The mobile information processing device 200 stores the key K for signature into the memory 204.

Figure 5B:
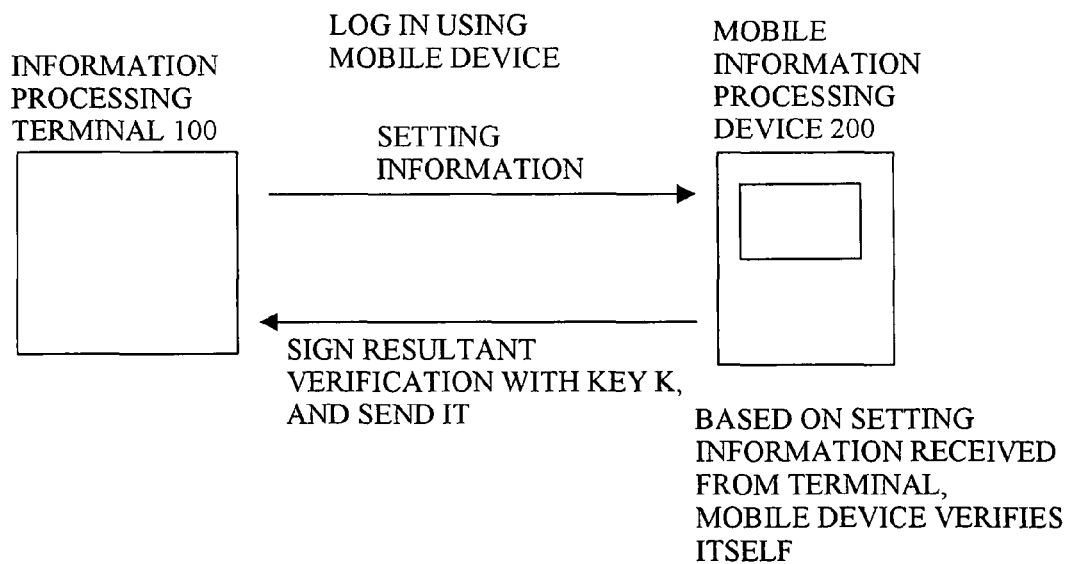
FIG. 5B illustrates procedures of transmissions and receptions for authentication between the information processing terminal and the mobile information processing device.

FIG. 5B illustrates procedures of transmissions and receptions for authentication between the information processing terminal 100 and the mobile information processing device 200. When the mobile information processing device 200 establishes a communication path to the information processing terminal 100 in the communication mode A, the information processing terminal 100 transmits the setting information to the mobile information processing device 200. The mobile information processing device 200 verifies the mobile information processing device 200 based on the received setting information. The mobile information processing device 200 digitally signs a statement or message on the resultant verification or verification determination with the key K and transmits the signed resultant verification statement to the information processing terminal 100. The information processing terminal 100 checks the signed resultant verification statement, and allows the login to it if the signed resultant verification statement proves true. The information processing terminal 100 and the mobile information processing device 200 then enter or transit into the communication mode B, and the information processing terminal 100 manages the presence of the user with the use of the mobile information processing device 200.

Figure 6:
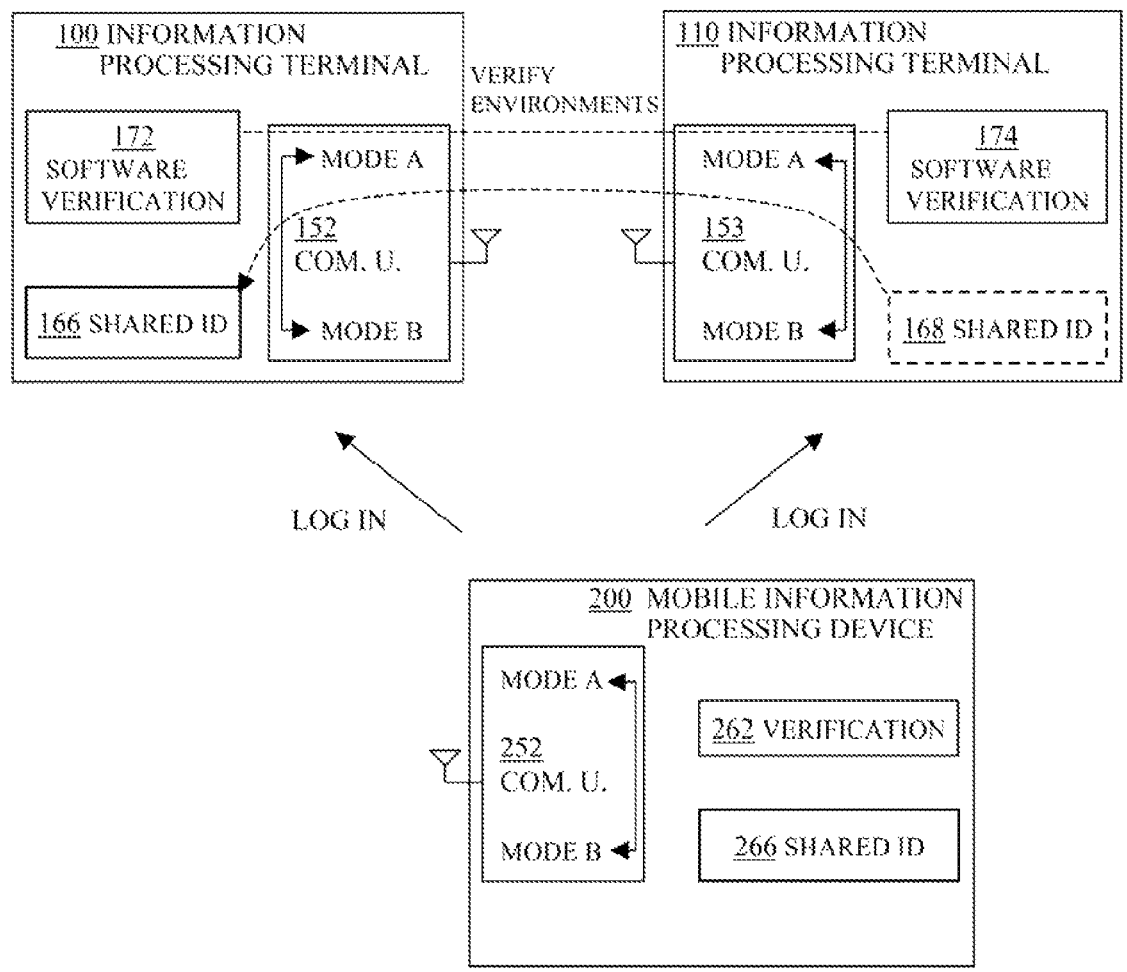
FIG. 6 illustrates a process for authentication for logging-in by a user to the information processing terminal, after logging-in by the user to another information processing terminal with the use of the mobile information processing device.

FIG. 6 illustrates a process for authentication for logging-in by a user to the information processing terminal 100, after logging-in by the user to another information processing terminal 110 with the use of the mobile information processing device 200. In this case, the information processing terminal 100 further includes a software verifying unit 172. The mobile information processing device 200 includes elements similar to those of the information processing terminal 100, and includes a software verifying unit 174, a shared ID storage unit 168, and the communication unit 153.

Figure 7A:
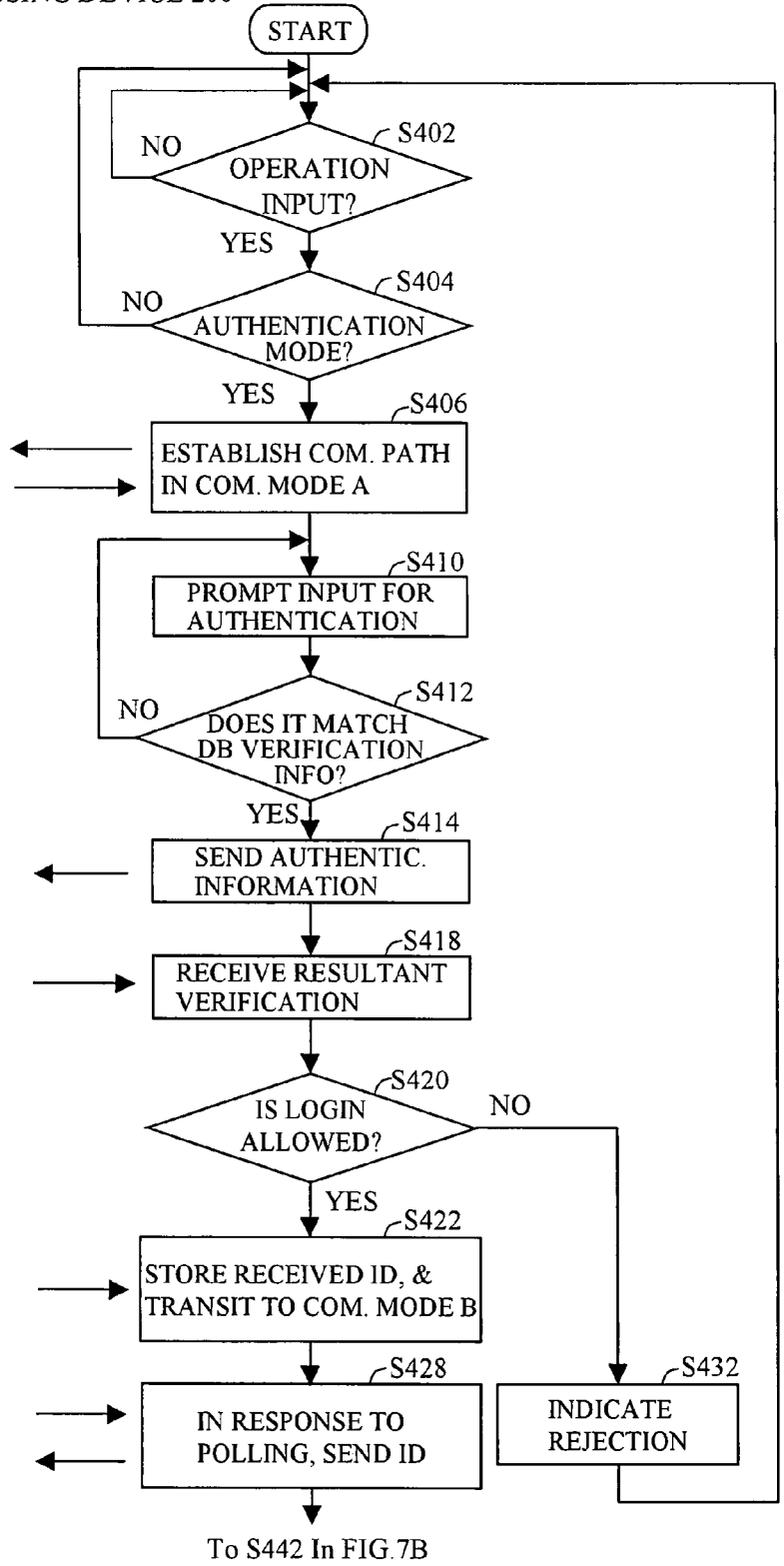
FIGS. 7A, 7B and 7C show a flow chart executed by the mobile information processing device.
Figure 7B:
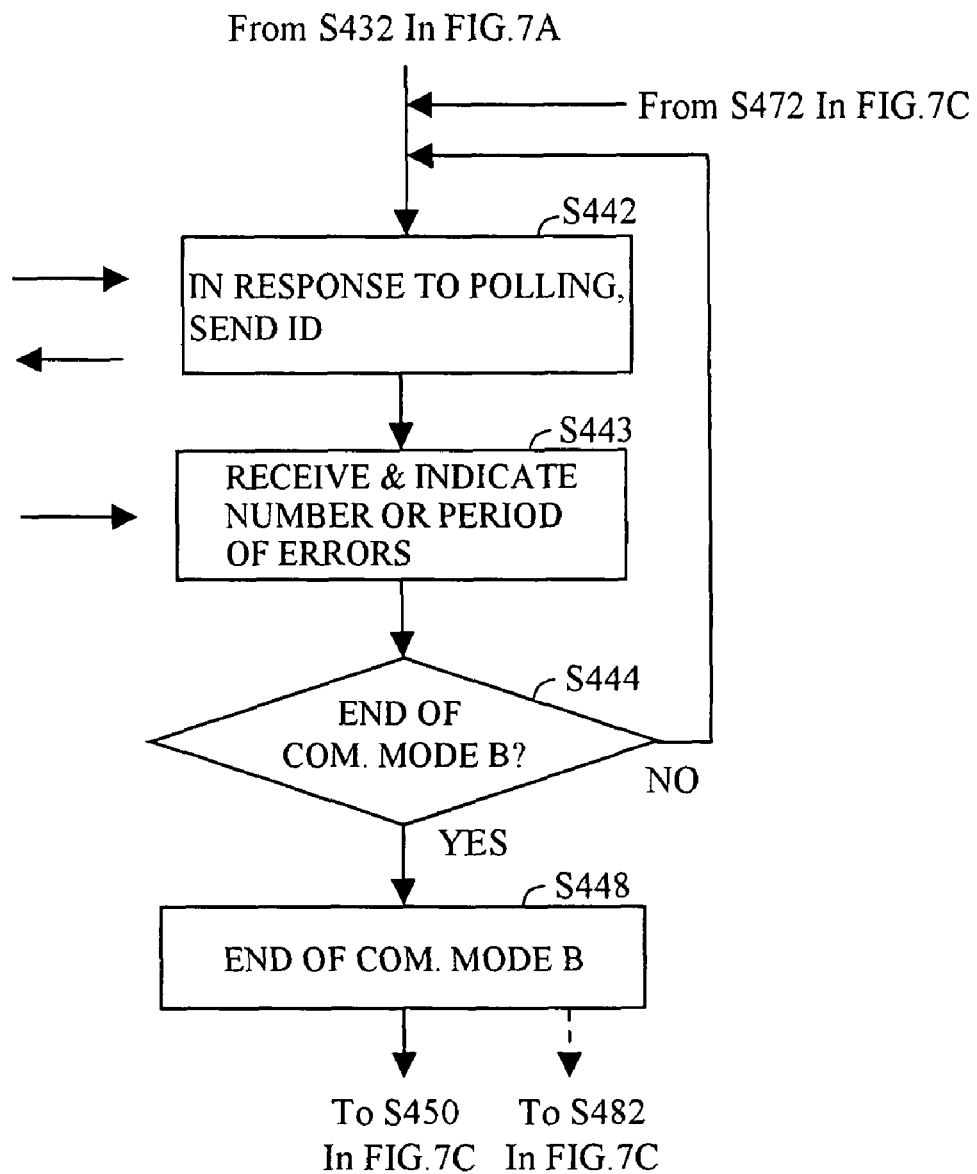
Figure 7C:
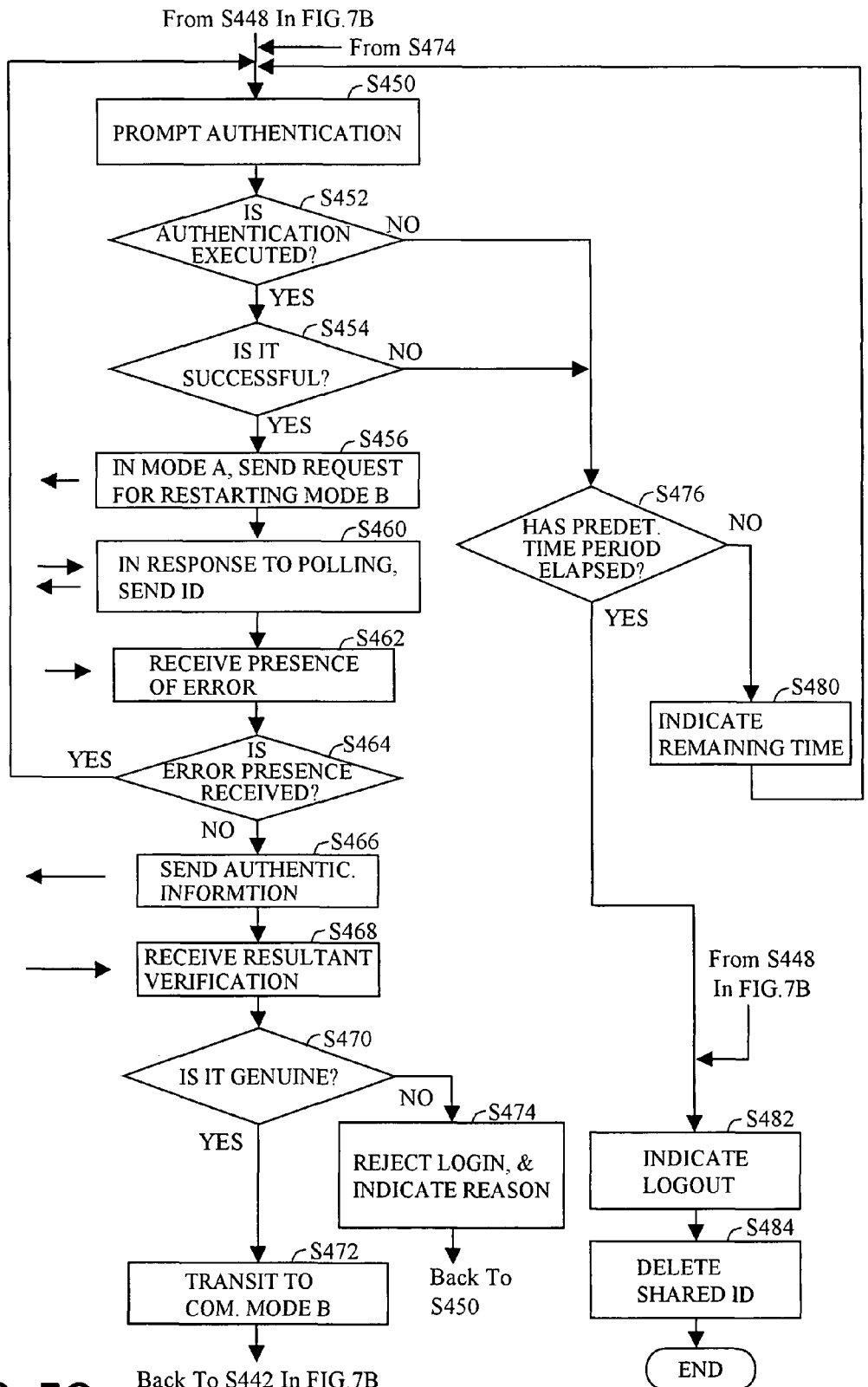
Figure 8A:
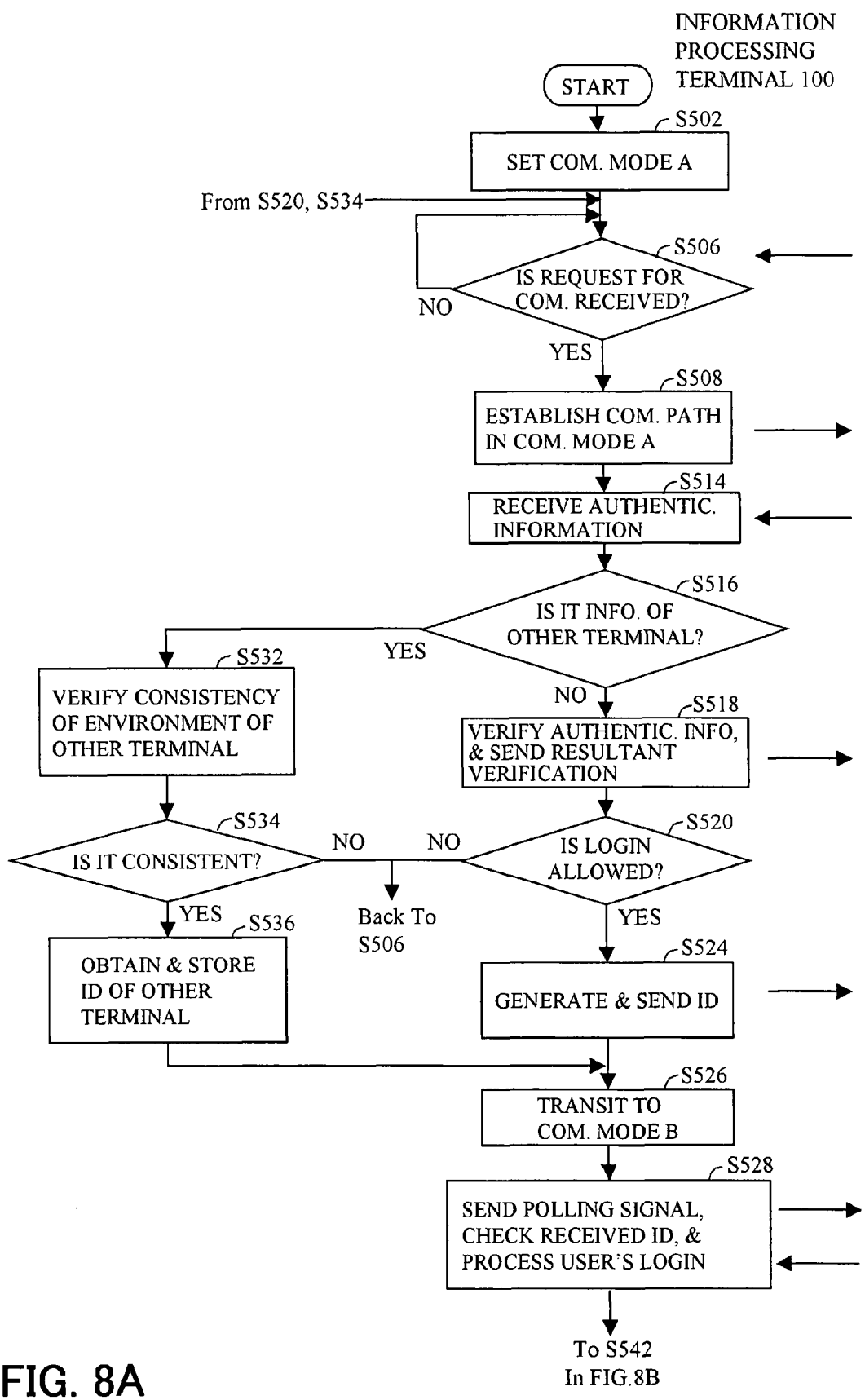
FIGS. 8A, 8B and 8C show a flow chart executed by the information processing terminal.
Figure 8B:
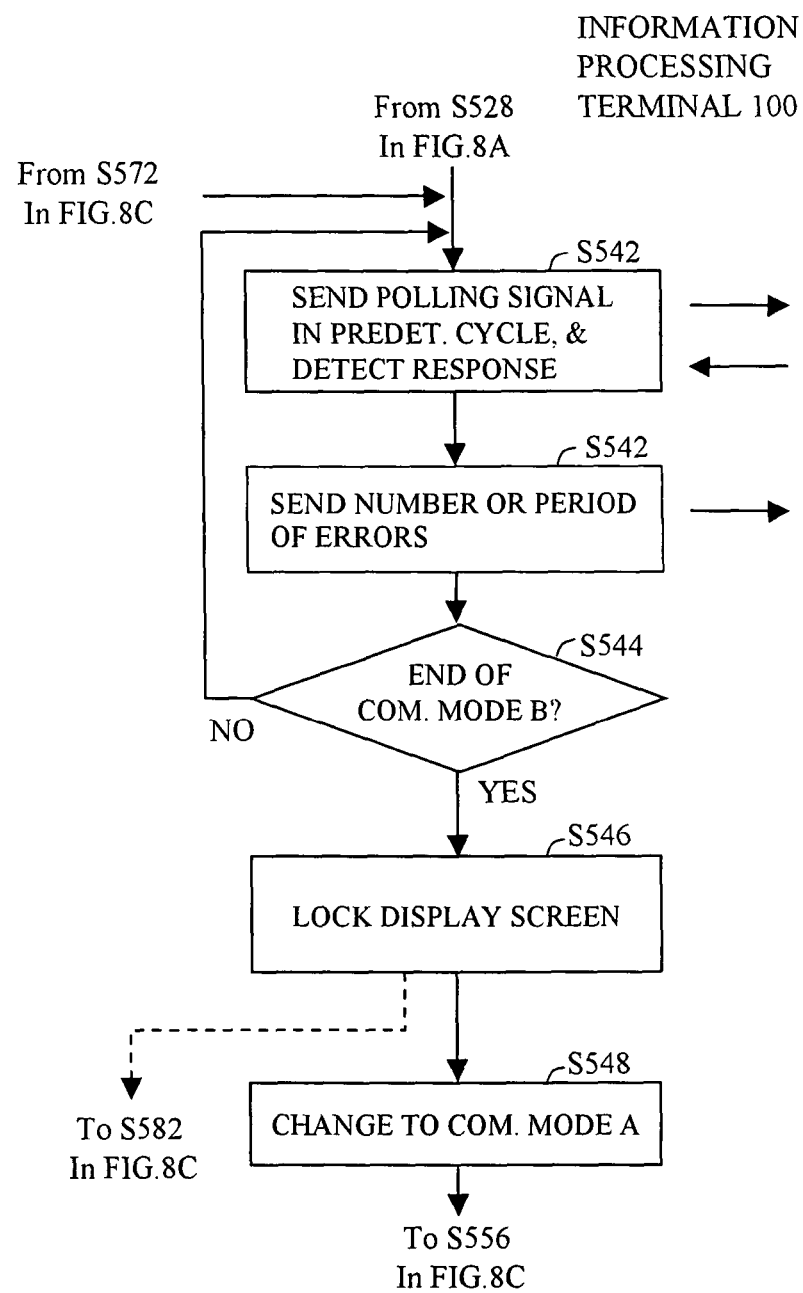
Figure 8C:
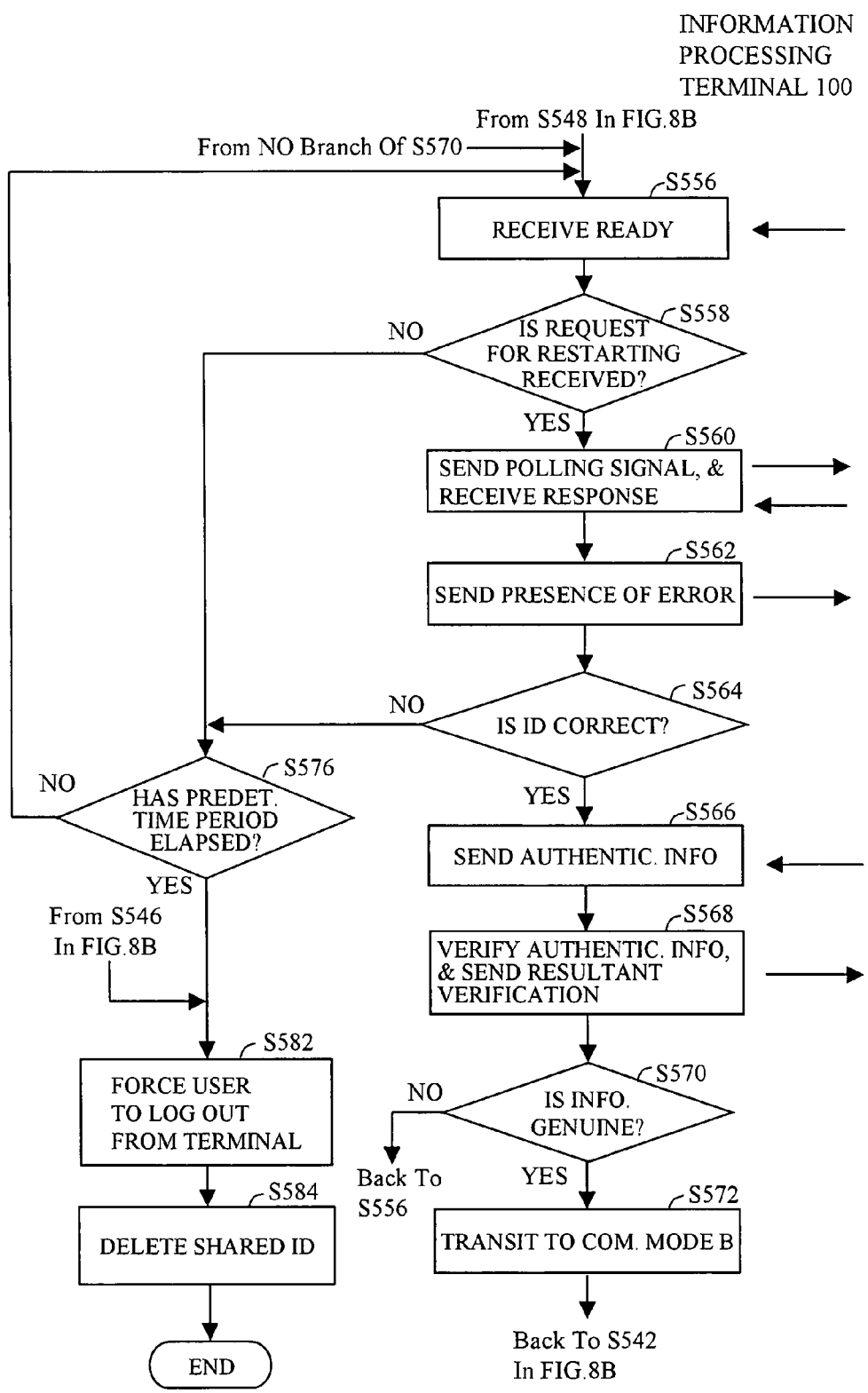

FIGS. 7A, 7B and 7C show a flow chart executed by the mobile information processing device 200. FIGS. 8A, 8B and 8C show a flow chart executed by the information processing terminal 100.

Referring to FIG. 7A, at Step 402, the operation detector unit 244 iteratively detects whether the keys 25 or 28 are operated. When the operation detector unit 244 detects operation of the keys 25 or 28 by a user, the comparator unit 246 at Step 404 compares the operation input information with operation information stored in the operation database 245. When the operation input matches with the information indicating transition of the mobile information processing device 200 into an authentication mode of operation, the comparator unit 246 activates the communication unit 252 and the authentication unit 262. If the input does not match with the information, the procedure returns to Step 402.

At Step 406, the communication unit 252 initiates the communication mode A for authenticating the user, and transmits a request for communication, to the information processing terminal 100, to thereby establish a communication path in the communication mode A, between the information processing terminal 100 and the communication unit 152.

Referring to FIG. 8A, at Step 502, the communication unit 152 initially sets the communication mode A. At Step 506, the communication unit 152 iteratively determines whether it has received a request for communication, from the mobile information processing device 200. If it is determined that a request for communication has been received, the communication unit 152 at Step 508 transmits a reply signal and establishes a communication path to the communication unit 252.

At Step 410, the authentication unit 262 prompts the user to input authentication information by means of the authentication information input unit 30, for example, by fingerprint scan. At Step 412, the authentication unit 262 compares the input authentication information with the information stored in the authentication information database (DB) 263, to determine whether the input information matches with the information in the database. If it is determined that that the input information does not match with the information in the database, the procedure returns to Step 410, and waits for another input of the authentication information. If it is determined that the input information matches with the information in the database, the authentication unit 262 at Step 414 transmits the authentication information to the authentication unit 162 via the communication unit 252 and the communication unit 152.

At Step 514, the authentication unit 162 receives the authentication information via the communication unit 152. At Step 516, the authentication unit 162 compares the received authentication information with the information in the authentication database 163 to determine as to whether the received authentication information contains authentication information of another information processing terminal (110). If it is determined that the received authentication information does not contain authentication information of another information processing terminal, the authentication unit 162 at Step 518 compares the received authentication information with the information in the authentication database 163 to verify whether the received authentication information is proved genuine, and transmits the resultant verification statement to the authentication unit 262 of the mobile information processing device 200 via the communication unit 152 and the communication unit 252.

At Step 520, the authentication unit 162 determines whether to allow the user to log in to the terminal, or whether the authentication information is genuine according to the resultant verification statement. If it is determined that the login is not allowed, the procedure returns to Step 506. If it is determined that the login is allowed, the authentication unit 162 at Step 524 generates a random number, produces an identification or ID for the presence management as authentication information based on the random number, stores the ID into the shared ID storage unit 166, and transmits the ID to the authentication unit 262 via the communication unit 152 and the communication unit 252. At Step 526, the authentication unit 162 causes the switching unit 164 to switch the communication mode of the communication unit 152 into the communication mode B. However, the communication modes A and B of the communication unit 152 may be the same operation mode, i.e. the active mode of operation, of the communication unit 152.

At Step 418, the authentication unit 262 receives the resultant verification statement from the authentication unit 162 via the communication unit 252, and determines at Step 420 whether to allow the login or whether the authentication information is genuine, according to the resultant authentication information. If it is determined that the login is not allowed, the authentication unit 262 at Step 432 indicates the rejection of the login and a reason for the rejection on the display unit 206. The procedure then returns to Step 402. If it is determined that the login is allowed, the authentication unit 262 at Step 422 stores the received ID into the shared ID storage unit 266, and causes the switching unit 264 to switch the communication mode of the communication unit 252 into the communication mode B.

At Step 528, the authentication unit 162 transmits a polling signal in the communication mode B, and causes the communication unit 252 to transmit the ID stored in the shared ID storage unit 266. The authentication unit 162 determines that the received ID matches with the ID stored in the shared information storage unit 166, and then executes a process for allowing the user to log in. The procedure then proceeds to Step 542.

At Step 428, in response to the polling signal from the communication unit 162, the authentication unit 262 retrieves the ID stored in the shared ID storage unit 266 and transmits it to the authentication unit 162. The procedure then proceeds to Step 442.

Referring to FIGS. 7B and 8B, at Step 542, the communication unit 152 of the information processing terminal 100 transmits a polling signal to the communication unit 252 for a predetermined number of times occurring in a predetermined cycle of 500 ms for example, in the communication mode B, detects each of reply signals, and then detects a shared identification or ID included in each reply signal. The communication unit 152 compares the received ID with the ID in the shared ID storage unit 166, and generates an error indication when the communication unit 152 can receive neither an ID nor the correct ID. The communication unit 152 transmits, to the communication unit 252, the number of successive occurrences of reception errors, or a length of time during which successive reception errors occur.

In response to the polling signal, the communication unit 252 at Step 442 transmits the ID stored in the shared ID storage unit 266 to the communication unit 152. At Step 443, the communication unit 252 receives the number of successive occurrences of the errors or the time length of occurrence of the successive errors, and indicates the number of successive occurrences of the errors or the time length of occurrence of the successive errors, on the display unit 206 of the mobile information processing device 200.

At Step 544, by determining whether the number of the successive errors transcends a threshold value, e.g. fifteen times, or whether the time length of occurrence of the successive errors transcends a threshold value, e.g. eight seconds, the communication unit 152 determines whether to disable the communication mode B for the communication with the communication unit 252, or whether to disconnect the corresponding communication path. If it is determined that the communication mode B should not be disabled, the procedure returns to Step 542. If it is determined that the communication mode B should be disabled, the authentication unit 162 at Step 546 locks the display screen of the display unit 106. In this case, the authentication unit 162 may indicate a prompt on the display unit 106 for the user to initiate the authentication process again and may indicate a warning of logging-out from the information processing terminal 100, or alternatively may generate a beep indicating a warning of logging-out from the information processing terminal 100 through the speaker of the display unit 106. This prevents a third party from attempting unauthorized operation or use of the information processing terminal 100, while the user, carrying the information processing terminal 100, stays away from the mobile information processing device 200 for a longer period of time than a predetermined period of time. At Step 548, the communication unit 152 enters or transits into the communication mode A. The procedure then proceeds to Step 556.

At Step 444, by determining whether the number of the successive errors transcends the threshold value, e.g. fifteen times, or whether the time length of occurrence of the successive errors transcends the threshold value, e.g. eight seconds, the communication unit 152 determines whether to disable the communication mode B for the communication with the communication unit 252, or whether to disconnect the corresponding communication path. If it is determined that the communication mode B should not be disabled, the procedure returns to Step 442. If it is determined that the communication mode B should be disabled, the authentication unit 262 at Step 448 disables the communication mode B of the communication unit 252. The procedure then proceeds to Step 450.

Referring to FIG. 7C, at Step 450, the authentication unit 262 indicates a prompt for the user to initiate the authentication process again, and thus performs the same processes as those of Step 410 and Step 412. In this case, the authentication unit 262 may indicate a warning of logging-out on the display unit 206, or alternatively may generate a beep indicating a warning of logging-out on the mobile information processing device 200 through the speaker. The authentication unit 262 at Step 452 determines whether authentication has been executed, and determines whether the authentication is successful at Step 454 if the authentication has been executed. If the authentication has not been executed or if the authentication has been unsuccessful, then the authentication unit 262 at Step 476 determines whether a predetermined period of time, e.g. ten minutes, elapses after the communication mode B is disabled at Step 448. If it is determined that the predetermined period of time has elapsed, the authentication unit 262 at Step 482 indicates on the display unit 206 that the user is forced to log out from the information processing terminal 100, and at Step 484 deletes the shared ID from the storage unit 266. Thus, the warning of logging-out may be indicated as described above on the display unit 206, a predetermined period of time before the actual logout from the information processing terminal 100 at Step 582. The procedure then exits from this routine. If it is determined that the predetermined period of time has not elapsed, the authentication unit 262 at Step 480 indicates, on the display unit 206, the remaining time length before the actual logging-out. The procedure then returns to Step 452.

If it is determined at Step 454 that the authentication has been successful, the authentication unit 262 at Step 456 establishes a communication path in the communication mode A in the communication unit 252, and transmits a request for restarting the communication mode B, to the communication unit 152. The authentication unit 262 then temporarily enters into the communication mode B, and waits for the polling signal from the communication unit 152.

Referring to FIG. 8C, at Step 556, the communication unit 152 becomes in a ready state to receive the request for the restarting, from the communication unit 252. At Step 558, the communication unit 152 determines whether it has received the request for restarting the communication mode B, from the communication unit 252. If it is determined that it has not received the request for the restarting, the authentication unit 162 at Step 576 determines whether a predetermined period of time has elapsed after the entry into the communication mode A at Step 548. If it is determined at Step 576 that the predetermined period of time has not elapsed, the procedure returns to Step 556. If it is determined that the predetermined period of time has elapsed, the authentication unit 162 at Step 582 performs a process of forcing the user to log out from the information processing terminal 100, and at Step 584 deletes the shared ID from the shared ID storage unit 166. The procedure then exits from the routine. Even when the user positively logs out by operating the information processing terminal 100, the authentication unit 162 deletes the shared ID from the shared ID storage unit 166.

If it determined at Step 558 that it has received the request for the restarting, then the communication unit 152 temporarily enters into the communication mode B. The communication unit 152 at Step 560 transmits a polling signal to the communication unit 252 and receives a reply signal, and at Step 562 transmits the presence or absence of an error. At Step 564, the authentication unit 162 determines whether the received ID is correct. If it is determined that it is incorrect, the procedure proceeds to Step 576. If it is determined that it is correct, the authentication unit 162 at Step 566 returns to the communication mode A and then waits for reception of the authentication information.

At Step 460, the communication unit 252 temporarily enters into the communication mode B, and, in response to the polling signal, transmits the ID stored in the shared ID storage unit 266. At Step 462, the communication unit 252 receives the presence or absence of a reception error from the communication unit 162. At Step 464, the authentication unit 262 determines whether a reception error has occurred. If it is determined that the reception error has occurred, the procedure returns to Step 450. If it is determined that the reception error has not occurred, the authentication unit 262 returns to the communication mode A, and at Step 466 transmits the authentication information to the authentication unit 162 via the communication units 252 and 152.

The authentication unit 162 at Step 566 receives the authentication information in the communication mode A. At Step 568, the authentication unit 162 verifies the authentication information, and transmits the resultant verification statement to the authentication unit 262 via the communication unit 152 and the communication unit 252. The authentication unit 262 at Step 468 receives the resultant verification statement.

At Step 570, the authentication unit 162 determines whether the authentication information is genuine. If it is determined that the authentication information is not genuine, the procedure returns to Step 556. If it is determined that the authentication information is genuine, the authentication unit 162 at Step 572 switches the communication mode of the communication unit 152 into the communication mode B. The procedure then returns to Step 542.

At Step 470, the authentication unit 262 determines whether the authentication information is genuine in accordance with the received resultant verification statement. If it is determined that the authentication information is not genuine, the authentication unit 262 at Step 474 indicates the rejection of the login and a reason for the rejection on the display device 206. The procedure then returns to Step 450. If it is determined that the authentication information is genuine, the authentication unit 262 at Step 472 switches the communication mode of the communication unit 252 into the communication mode B. The procedure then returns to Step 442.

Thus, in this embodiment, even if the user, carrying the information processing terminal 100, temporarily or for a short time leaves his or her seat associated with the mobile information processing device 200, the user can readily use the information processing terminal 100 again when the user returns to the seat within a predetermined period of time. On the other hand, the information processing terminal 100 automatically performs the logging-out process, when the user has not returned to his or her seat within the predetermined period of time. This prevents unauthorized use of the information processing terminal 100 by a third party. The shared ID is deleted in this embodiment, in order to prevent unauthorized use of the information processing terminal 100 and the mobile information processing device 200 by an unauthorized person other than the authorized user, or to prevent illicit retrieval of the shared ID from the information processing terminal 100 and the mobile information processing device 200, for unauthorized use.

Alternatively, Steps 450-480 of FIG. 7C may be eliminated, so that the procedure is configured to proceed to Step 482 of FIG. 7C after Step 448 of FIG. 7B in the mobile information processing device 200. Step 548 of FIG. 8B and Steps 556-576 of FIG. 8C may also be eliminated, so that the procedure is configured to proceed to Step 582 of FIG. 8C after Step 546 of FIG. 8B in the information processing terminal 100. In this case, when a user, carrying the information processing terminal 100, leaves his or her seat associated with the mobile information processing device 200 for a longer period of time than a predetermined period of time, the information processing terminal 100 automatically executes the logging-out process. This prevents illicit use of the information processing terminal 100 by an unauthorized person. In order to use the information processing terminal 100 again, the user has to repeat the operation and authentication of FIG. 7A.

As described above, the communication unit 252 of the mobile information processing device 200 operates in the two-way communication mode or the active mode of operation, when it transmits or receives the authentication information. On the other hand, the communication unit 252 operates in the receive ready mode of communication or the passive mode of operation, while it waits for the reception of a polling signal, receives the polling signal, and transmits the ID. Thus, the power consumption of the mobile information processing device 200 can be reduced, and the run time of the battery 210 of the mobile information processing device 200 can be extended.

Referring to FIG. 6, when the user further logs in to the information processing terminal 100 after having normally logged in to the information processing terminal 110 with the use of the mobile information processing device 200, the software verifying unit 172 of the information processing terminal 100 communicates with the software verifying unit 174 in the communication mode A via the communication unit 152 and the communication unit 153, and verifies the authentication environments. As a result of the verification, if it is determined that both of the authentication environments are consistent with each other, the information processing terminal 100 obtains an ID stored in the shared ID storage unit 168 of the information processing terminal 110, and stores the ID in the shared ID storage unit 166. The information processing terminal 100 uses the obtained ID for the presence management without generating a new ID.

Referring back to FIGS. 6 and 8A, if it is determined at Step 516 that the received authentication information is authentication information for another information processing terminal (110), the software verifying unit 172 at Step 532 communicates with the software verifying unit 172 of the information processing terminal 110 via the communication unit 152 and the communication unit 252, and verifies whether the authentication environment of the information processing terminal 110, i.e. software for authentication, is consistent with that of the information processing terminal 100.

If it is determined at Step 534 that the authentication environments are inconsistent with each other, the procedure returns to Step 506. If it is determined that both of the authentication environments are consistent with each other, the authentication unit 162 at Step 536 obtains a copy of the ID stored in the shared ID storage unit 168 from the information processing terminal 110 via the communication units 152 and 153, and stores the copy of the ID into the shared ID storage unit 166. The procedure then proceeds to Step 526.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An authentication system which manages presence of a user, the authentication system comprising:
   a mobile information processing device including;
      a first authentication database which pre-stores authentication information for the user,
      a first shared identification storage unit which stores a shared identification for presence management, which identification is received from an information processing terminal,
      an authentication information input unit which obtains authentication information specific to the user, after a path to the information processing terminal in a first wireless communication mode is established,
      a first authentication unit which, when the authentication information input unit obtains the authentication information, verifies as to whether the obtained authentication information is correct by comparing the obtained authentication information with the pre-stored authentication information in the first authentication database, and which stores the shared identification for presence management in the first shared identification storage unit when the first authentication unit receives the shared identification for presence management from the information processing terminal,
      a first display unit which indicates representation of failure of authentication when the obtained authentication information is verified as incorrect, and
      a first communication unit which is capable of wirelessly communicating with the information processing terminal, in the first wireless communication mode for two-way communication or in a second wireless communication mode for near field communication, wherein,
   the first communication unit transmits, in response to an operation input by the user, a request for the two-way communication to the information processing terminal, wherein,
   the first communication unit transmits, when the authentication information verified by the first authentication unit is correct, the authentication information to the information processing terminal in the first wireless communication mode, then receives the shared identification for presence management from the information processing terminal in the first wireless communication mode, and then changes from the first wireless communication mode into the second wireless communication mode, and wherein,
   the first communication unit transmits, in response to polling from the information processing terminal, a reply containing the shared identification for presence management in the second wireless communication mode back to the information processing terminal,
   the authentication system further comprising:
   an information processing terminal including;
      a second authentication database which pre-stores authentication information for the user,
      a second shared identification storage unit which stores a shared identification for presence management, a second authentication unit which verifies as to whether the authentication information received from the mobile information processing device is correct by looking into the second authentication database, and which unit generates a shared identification for presence management and stores the generated shared identification for presence management in the second shared identification storage unit, when the received authentication information is verified as correct, a second display unit which indicates representation of failure of authentication when the received authentication information is verified as incorrect, and a second communication unit which is capable of wirelessly communicating with the mobile information processing device, in the first wireless communication mode for two-way communication or in the second wireless communication mode for near field communication, wherein, the second communication unit of the first wireless communication mode establishes, in response to a request for two-way communication transmitted by the mobile information processing device, a two-way wireless communication path to the mobile information processing device, wherein the second communication unit receives, in the first wireless communication mode, the authentication information from the mobile information processing device, wherein, the second communication unit changes, when the received authentication information is verified as correct, from the first wireless communication mode into the second wireless communication mode, and iteratively performs polling of the mobile information processing device to receive a reply from the mobile information processing device, and wherein, the second communication unit determines, when no correct shared identification has been received from the mobile information processing device in the second wireless communication mode, whether a number of successive errors transcends a threshold number or whether a time length of successive errors transcends a threshold time length, and locks a display screen of the second display unit when the threshold number or the threshold time length is transcended.

2. A mobile information processing device which manages presence of a user in cooperative operation with an information processing terminal, the mobile information processing device comprising:

an authentication database which pre-stores authentication information for the user, a shared identification storage unit which stores a shared identification for presence management, which identification is received from the information processing terminal, an authentication information input unit which obtains authentication information specific to the user, after a path to the information processing terminal in a first wireless communication mode is established, an authentication unit which, when the authentication information input unit obtains the authentication information, verifies as to whether the obtained authentication information is correct by comparing the obtained authentication information with the pre-stored authentication information in the authentication database, and which, when the authentication unit receives a shared identification for presence management from the information processing terminal, stores the received shared identification for presence management in the shared identification storage unit, a display unit which indicates representation of failure of authentication when the obtained authentication information is verified as incorrect, and a communication unit which is capable of wirelessly communicating with an information processing terminal, in the first wireless communication mode for two-way communication or in a second wireless communication mode for near field communication, wherein, the communication unit transmits, in response to an operation input by the user, a request for two-way communication to the information processing terminal, wherein, the communication unit, when the obtained authentication information is verified by the authentication unit as correct, transmits the authentication information in the first wireless communication mode to the information processing terminal, then receives, in the first wireless communication mode, the shared identification for presence management from the information processing terminal, and then changes from the first wireless communication mode into the second wireless communication mode, and wherein, the communication unit transmits, in response to polling from the information processing terminal, a reply containing the shared identification for presence management in the second wireless communication mode back to the information processing terminal.

3. The mobile information processing device according to claim 2, wherein the communication unit further determines whether to disable the second wireless communication mode by determining whether a number of successive errors transcends a threshold number for the iterative polling from the information processing terminal, or whether a time length of successive errors transcends a threshold time length for the iterative polling from the information processing terminal, the authentication unit further indicates, if the communication unit determines that the second wireless communication mode is to be disabled, a prompt for the user to initiate the authentication again and also a warning of logging-out on the display unit, and then disables the communication unit from the second wireless communication mode.

4. The mobile information processing device according to claim 2, wherein the authentication unit further indicates a logout in the information processing terminal and deletes the shared identification from the shared identification storage unit, when a threshold period of time has elapsed without additional successful authentication of the user after the second wireless communication mode is disabled.

5. An information processing terminal in use for managing presence of a user in cooperative operation with a mobile information processing device, comprising:

an authentication database which pre-stores authentication information for the user, a shared identification storage unit which stores a shared identification for presence management, an authentication unit which verifies as to whether the authentication information received from the mobile information processing device is correct by looking into the authentication database, and which unit generates a shared identification for presence management and stores the shared identification for presence management in the shared identification storage unit, when the received authentication information is verified as correct, a display unit which indicates representation of failure of authentication when the received authentication information is verified as incorrect, and a communication unit which is capable of wirelessly communicating with the mobile information processing device, in a first wireless communication mode for two-way communication or in a second wireless communication mode for near field communication, wherein, said second the communication unit establishes, in response to a request for two-way communication transmitted by the mobile information processing device, a two-way wireless communication path to the mobile information processing device in the first wireless communication mode, wherein, the communication unit receives the authentication information in the first wireless communication mode from the mobile information processing device, wherein, the communication unit changes, when the received authentication information is verified as correct, from the first wireless communication mode into the second wireless communication mode, then iteratively performs polling of the mobile information processing device to receive a reply from the mobile information processing device, and wherein, the communication unit determines, when no correct shared identification has been received in the second wireless communication mode from the mobile information processing device, whether a number of successive errors transcends a threshold number, or whether a time length of successive errors transcends a threshold time length, and locks a display screen of the display unit when the threshold number or the threshold time length is transcended.

6. The information processing terminal according to claim 5, wherein, the authentication unit further allows, when the received authentication information is verified as correct, the user to log in to the information processing terminal, and wherein, the authentication unit further deletes the shared identification from the shared information storage unit after the user logs out from the information processing terminal.

7. The information processing terminal according to claim 5, wherein the communication unit further determines whether to disable the second wireless communication mode by determining whether the number of successive errors transcends the threshold number for the iterative polling, or whether the time length of successive errors transcends the threshold time length for the iterative polling, and wherein, the authentication unit further indicates, if the communication unit determines that the second wireless communication mode is to be disabled, a prompt for the user to initiate the authentication again and also a warning of logging-out on the display unit, and then further changes the communication unit from the second wireless communication mode to the first wireless communication mode.

8. The information processing terminal according to claim 6, wherein the communication unit further determines whether to disable the second wireless communication mode by determining whether the number of successive errors transcends the threshold number for the iterative polling, or whether the time length of successive errors transcends the threshold time length for the iterative polling, and wherein, the authentication unit further indicates, if the communication unit determines that the second wireless communication mode is to be disabled, a prompt for the user to initiate the authentication again and also a warning of logging-out on the display unit, and then further changes the communication unit from the second wireless communication mode into the first wireless communication mode.

9. The information processing terminal according to claim 5, wherein the authentication unit further allows the user to log in to the information processing terminal on the basis of the resultant verification, and wherein, after the number of successive reception errors transcending the threshold number has been detected for the iterative polling of the mobile information processing device, or after the time length of successive reception errors transcending the first threshold time length have been detected for the iterative polling of the mobile information processing device, the authentication unit further cancels the logging-out process when it receives correct authentication information from the mobile information processing device within a second threshold time length, while the authentication unit further performs the logging-out process when it receives no correct authentication information from the mobile information processing device within the second threshold period of time.

10. The information processing terminal according to claim 5, further comprising an authentication environment verifying unit which verifies consistency of both an authentication environment of the first information processing terminal and an authentication environment of a second information processing terminal, wherein the mobile information processing device is used for logging in to the first information processing terminal, while the mobile information processing device is also used for logging in to the second information processing terminal, when the authentication unit of the first information processing terminal determines that the received authentication information is incorrect for use in the first information processing terminal, the authentication environment verifying unit of the first information processing terminal verifies as to whether an authentication environment and authentication software of the first information processing terminal consist with an authentication environment and authentication software of the second information processing terminal, and when the authentication information can be authenticated in the second information processing terminal, the communication unit of the first information processing terminal receives a shared identification from the second information processing terminal, and stores the received shared identification in the information storage unit of the first information processing terminal.

11. A computer-readable medium recording a computer program which causes a computer to execute an authentication that manages presence of a user in cooperative operation with an information processing terminal, the program comprising:

pre-storing authentication information for the user, transmitting, in response to an operation input by the user, a request for two-way communication to the information processing terminal, in a first wireless communication mode for two-way communication, obtaining authentication information specific to the user, after a path to the information processing terminal in the first communication mode is established, verifying as to whether the obtained authentication information is correct by comparing the obtained authentication information with the pre-stored authentication information, indicating representation of failure of authentication when the obtained authentication information is verified as incorrect, transmitting the authentication information to the information processing terminal in the first wireless communication mode, when the obtained authentication information is verified as correct,
receiving a shared identification for presence management from the information processing terminal in the first wireless communication mode,
storing the received shared identification in response to receipt of the shared identification,
changing, in response to receipt of the shared identification, from the first wireless communication mode into a second wireless communication mode, and
transmitting, in response to polling from the information processing terminal, a reply containing the shared identification in the second wireless communication mode back to the information processing terminal.

* * * * *